Patented Jan. 3, 1933

1,893,077

UNITED STATES PATENT OFFICE

AUGUST GARWEG, OF WUPPERTAL-RONSDORF, GERMANY

HARDENING MEDIUM AND PROCESS FOR HARDENING TOOLS OF IRON OR STEEL

No Drawing. Application filed September 26, 1931, Serial No. 565,399, and in Germany September 26, 1930.

This invention relates to a hardening medium and a process for hardening tools of iron or steel, especially such which come into question for the working of wood, cardboard, leather and the like.

The new hardening medium differs from the known media in that to a mixture of water, carbon dust, potassium-ferro-cyanide and oil pulverized argillaceous slate is added in such a manner that 250 grs of ground slate are added to a mixture composed of a very small quantity of water, 250 grs of carbon dust, 75 grs of potassium-ferro-cyanide and ½ ltr of oil.

The new process consists in that by employing the above mentioned hardening medium the tool heated to 600 to 700° C. is strewn with potassium-ferro-cyanide, is again heated to 800 to 900° C. after this salt has penetrated in the tool and the tool is then cooled in a mixture composed of one part by weight of water, 250 grs of carbon dust, 75 grs of potassium-ferro-cyanide, ½ ltr of oil and 250 grs of ground slate.

Care must be taken that the potassium-ferro-cyanide has thoroughly penetrated before the second heating of the tool. It is advisable after cooling the tool in the above mentioned mixture to again dip same in cold water.

This manner of treatment of tools made of iron or steel causes a refining and a cut resisting hardness in the critical zones of the material, thereby preventing the occurrence of cracks or crevices.

I claim:—

1. A hardening medium for tools made of iron and steel, comprising a mixture of a very small quantity of water, 250 grs of carbon dust, 75 grs of potassium-ferro-cyanide and ½ ltr of oil to which 250 grs of ground slate are added.

2. A method for hardening tools of iron and steel employing the hardening medium specified in claim 1, consisting in heating the tool to 600 to 700° C., in strewing potassium-ferro-cyanide on the tool thus heated, in again heating the tool to 800 to 900° C. after the potassium-ferro-cyanide has penetrated therein, and in finally cooling the tool in a mixture composed of a very small quantity of water, 250 grs of carbon dust, 75 grs of potassium-ferro-cyanide, ½ ltr of oil and 250 grs of ground slate.

In testimony whereof I affix my signature.

AUGUST GARWEG.